3,305,532
CONTINUOUS DRYING OF GRANULAR POLYETHYLENE TEREPHTHALATE
Pieter H. Middleburg and Hans Nieuwenhuysen, Arnhem, and Marius E. le Cosquino de Bussy, Emmen, Netherlands, assignors, by mesne assignments, to American Enka Corporation, Enka, N.C., a corporation of Delaware
No Drawing. Filed July 5, 1962, Ser. No. 207,774
Claims priority, application Netherlands, July 7, 1961, 266,836
3 Claims. (Cl. 260—75)

This invention relates to a process for the drying in a continuous manner of water-containing granules of amorphous polyethylene terephthalate, in which process the granules are at least partially crystallized prior to drying.

It has already been proposed to dry water-containing granules of amorphous polyethylene terephthalate in a continuous manner, by a process in which the granules are first at least partially crystallized in a continuous manner by means of a hot inert gas, the granules being in vigorous motion relative to each other, after which the crystallized granules are dried in a continuous manner by means of an inert gas at an elevated temperature, the granules then being at most in slow motion relative to each other.

The partial or complete crystallization of the granules of polyethylene terephthalate, or in other words the pre-crystallization of the granules, has for its object to prevent the granules from sticking together during the drying process when the granules are only in slow motion relative to each other.

It has been proposed to carry out the aforesaid process in such manner that the pre-crystallization of the amorphous polyethylene terephthalate granules is effected by treating the granules in a rotating tilted cylinder through which the granules are passed countercurrently to a stream of hot air. In that case, in order to prevent the granules from sticking together the cylinder should not be filled completely, since otherwise the granules are not in vigorous motion relative to each other. This vigorous motion of the granules is essential to prevent the granules from sticking together.

A disadvantage to such a pre-crystallization method, however, is not only that the required equipment is relatively bulky and complex in proportion to its capacity, but also that the energy consumption is high. Moreover, the granules are not mixed satisfactorily.

It should be added that to obviate the foregoing drawbacks, it has also been proposed to feed the amorphous granules in a continuous manner to the top of a vertically positioned cylinder and to discharge the granules at the base thereof, hot air being blown into the cylinder at the base for the purpose of drying the at least partially crystallized granules, saturated steam being fed into the upper part of the cylinder for the purpose of pre-crystallizing the amorphous granules, both media being discharged at the top of the cylinder. In the two steps of this process there is obtained in this way only little motion of the granules relative to each other.

Although this last-mentioned process is generally satisfactory, it does have the disadvantage that in the event of the steam supply being disturbed or interrupted, the granules will stick together in the upper part of the cylinder, that is during the pre-crystallization, and form a large or massive cake. Hence the process cannot be resumed until this cake has been removed, which is troublesome and requires an inordinate amount of time.

The process according to the present invention makes it possible for these drawbacks to be obviated.

According to the present invention, therefore, the first-mentioned process indicated as broadly known is drastically modified in that the pre-crystallization of the water-containing amorphous polyethylene terephthalate granules is effected by continuously feeding the granules to, and mixing them with, a layer of granules consisting of at least 50% by weight of at least partially crystallized granules and the remainder amorphous granules, which layer of granules is fluidized by means of an inert gas having a temperature of at least 110° C., the ratio of the height of the layer of fluidized granules to the height of the layer of non-fluidized granules being at least 2.

In accordance with the invention, the layer of granules must consist of at least 50% by weight of pre-crystallized granules, each of which is partially or entirely crystallized. By at least partially crystallized is to be understood that the granule must be crystallized to such an extent that it does not soften when heated with air at a temperature above 70° C. and that it does not stick to other granules.

If the layer of granules should continuously consist of less than 50% by weight of pre-crystallized granules, then the granules will stick together during the drying step when there is only little motion of the granules relative to each other.

As the fluidizing medium any gas may be used provided that it is inert relative to the granules, for instance: nitrogen, carbon dioxide, air etc. For the sake of economy it will be generally preferable to choose air.

The temperature of the fluidization medium must be above 110° C. because at temperatures below 110° C. the granules do not crystallize sufficiently, so that after the subsequent drying step the granules will be stuck together.

The particular temperature to be chosen for the fluidization medium is dependent on various factors. For instance, it is undesirable to employ temperatures of 200° C. or higher, since in that case thermal degradation of the polyethylene terephthalate may occur. In order to obtain sufficiently crystallized granules of polyethylene terephthalate the temperature must be adapted to the rate at which the granules are supplied to the process.

The hot gas which is used for the fluidization and the pre-crystallization of the granules may be used again, if necessary or desired after further heating, for drying the partially or completely crystallized granules.

In carrying out the process according to the present invention it is preferred that the level of the layer of non-fluidized granules be not too high, since otherwise the granules supplied and the layer of granules will not be properly mixed during fluidization with the result that a number of granules may stick together and may form conglomerates. When thus formed the conglomerates may give rise to caking difficulties during the drying step.

The same precaution applies if the ratio of the height of the layer of fluidized granules to that of the layer of non-fluidized granules is lower than 2, which in fact is the minimum ratio according to the present invention.

The fluidization of the granules of polyethylene terephthalate may be carried out by means of a hot inert gas with the aid of a vertically-positioned vessel which is provided with a perforated bottom through which the hot inert gas is forced upwardly. The vessel may have any desired cross-section, but it is generally preferred to use one having a round cross-section in order to obtain the most favorable conditions for fluidization of the granules of polyethylene terephthalate.

It is already known that after the crystallization process the granules of at least partially crystallized polyethylene terephthalate may be continuously dried while they are on a moving conveyor belt. The conveyor belt is positioned in a drying chamber through which a suitable drying medium, such as for instance hot air, is blown.

The crystallized granules of polyethylene terephthalate may also be dried in a continuous manner with the aid of an encased screw conveyor. Through the encasing a suitable drying medium, such as hot air or other inert gas, is blown in a direction opposite to that in which the granules are conveyed.

Drying may also be carried out in a convenient manner by conveying the crystallized granules downwardly through a vertically positioned cylinder, and countercurrently to a hot drying medium such as air or other gas.

Preferably the temperature of the inert drying gas, for instance carbon dioxide, nitrogen, air, etc., should be above 80° C., since at lower temperatures it would take too long to obtain granules of polyethylene terephthalate containing less than 0.01% by weight of moisture (this low moisture content being essential, since otherwise the molten granules of polyethylene terephthalate cannot be spun into threads). The temperature of the drying gas may be made even higher, namely to or even above 180° C. Too high temperatures, however, should be avoided in view of the possible occurrence of thermal degradation of the polymeric material.

In order to indicate still more fully the nature of the present invention, the following example of typical procedures is set forth, it being understood, however, that this description is presented by way of illustration only, and not as limiting the scope of the invention.

*Example*

The apparatus for the fluidization and pre-crystallization of amorphous polyethylene terephthalate granules consisted of a vertically-positioned cylinder having a diameter of 22 cm. and a height of 90 cm. At the top the cylinder was provided with a supply line for amorphous granules of polyethylene terephthalate and at the bottom with a supply line for a hot gas and a discharge line for the treated granules. Before the fluidization and pre-crystallization were started, the cylinder was charged with completely crystallized polyethylene terephthalate granules to a height of 30 cm.

The apparatus for the drying of the granules obtained from the pre-crystallizer consisted of a cylinder positioned under the crystallizer, which cylinder had a diameter of 30 cm. and a height of 120 cm. At the top the cylinder was provided with a feeding device for the granules of polyethylene terephthalate obtained from the pre-crystallization cylinder, and at the bottom with a discharge device for dried granules and an inlet for drying gas. Before the continuous drying operation was begun the cylinder was filled with completely crystallized polyethylene terephthalate granules.

Runs were made in which, respectively, (a) the amount of amorphous granules fed to the pre-crystallizer, (b) the height of the layer of fluidized granules, (c) the temperature of the hot air during crystallization and (d) the temperature of the hot air during drying were varied.

The results are shown in the following table:

TABLE

| Feed rate of granules cm.³/hour | Height in cm. of the layer of non-fluidized granules | Height in cm. of the layer of fluidized granules | Temperature in ° C. of the air fed to the pre-crystallizer | Temperature in ° C. of the drying air | Percentage of crystallized granules after 2 hrs. operation of the pre-crystallizer | Sticking of the granules after drying |
|---|---|---|---|---|---|---|
| 360 | 30 | 60 | 185 | 150 | 99 | None. |
| 1,080 | 30 | 60 | 185 | 150 | 97 | Do. |
| 2,180 | 30 | 60 | 185 | 150 | 95 | Do. |
| 3,200 | 30 | 100 | 185 | 150 | 50 | Do. |
| 3,600 | 30 | 100 | 185 | 150 | 48 | Yes. |
| 1,080 | 30 | 51 | 185 | 150 | (¹) | Yes. |
| 1,080 | 30 | 60 | 185 | 150 | 97 | None. |
| 1,080 | 30 | 60 | 110 | 150 | 48 | Yes. |
| 360 | 30 | 60 | 115 | 150 | 55 | None. |
| 360 | 30 | 60 | 110 | 150 | 45 | Yes. |
| 1,080 | 30 | 60 | 185 | 90 | 97 | None. |
| 1,080 | 30 | 60 | 185 | 120 | 97 | Do. |
| 1,080 | 30 | 60 | 185 | 150 | 97 | Do. |
| 1,080 | 30 | 60 | 185 | 180 | 97 | Do. |

¹ No homogeneous distribution of the crystallized and non-crystallized granules.

The foregoing table clearly shows that in order to prevent sticking, the layer of granules of polyethylene terephthalate in the pre-crystallizer should continuously consist of at least 50% by weight of crystallized granules, that the height of the layer of fluidized granules should be at least twice the height of the layer of non-fluidized granules, and that the temperature of the gas employed for the crystallization process should be higher than 110° C.

While a specific example of a preferred method embodying the present invention has been set forth above, it will be understood that many changes and modifications may be made in the method of procedure without departing from the spirit of the invention. It will therefore be understood that the example cited and the particular proportions and methods of operation set forth above are intended to be illustrative only, and are not intended to limit the scope of the invention.

What is claimed is:

1. A method of continuously drying water-containing granules of amorphous polyethylene terephthalate comprising:
   (a) forming a layer of polyethylene terephthalate granules consisting of from 50 percent to 100 percent by weight of at least partially crystallized polyethylene terephthalate granules and from 50 percent to 0 percent by weight amorphous polyethylene terephthalate granules, the height of said layer being less than such height whereat fluidization and mixing of the granules is adversely affected to the extent that sticking together and conglomeration thereof occur during step (b);
   (b) fluidizing said layer of polyethylene terephthalate granules by means of a continuous stream of an inert gas having a temperature of at least 110° C. but less than 200° C., so that the ratio of the height of the layer of the thus fluidized granules to the height of the layer of the non-fluidized granules of step (a) is at least two;
   (c) continuously introducing into and mixing with the said fluidized granules the water-containing amorphous polyethylene terephthalate granules to be dried, whereby said water containing amorphous polyethylene terephthalate granules are at least partially crystallized;

(d) continuously withdrawing from the resulting mixture at least partially crystallized polyethylene terephthalate granules; and (e) thence at elevated temperatures continuously drying said at least partially crystallized granules which are in at most slow motion relative to each other;

(f) the ratio of the height of the layer of said fluidized granules to the height of the layer of said non-fluidized granules continuously is at least two and the composition of said fluidized granules continuously consists of from 50 percent to 100 percent by weight of at least partially crystallized polyethylene terephthalate granules and from 50 percent to 0 percent by weight amorphous polyethylene terephthalate granules to prevent sticking together of the at least partially crystallized granules during step (e).

2. The method of claim 1, wherein the drying of step (e) is carried out by means of an inert gas at a temperature above 80° C.

3. The method of claim 1, wherein the inert gas of step (b) is air.

References Cited by the Examiner
UNITED STATES PATENTS 3,014,011 12/1961 Zoetbrood _____ 260—75
3,075,952 1/1963 Coover et al. _____ 260—75

WILLIAM H. SHORT, *Primary Examiner.*

LOUISE P. QUAST, *Assistant Examiner.*